United States Patent [19]

Hinton

[11] 4,005,013
[45] Jan. 25, 1977

[54] DIFFERENTIAL CONTROLLER VALVE AND SEQUENCER

[75] Inventor: Melvin F. Hinton, La Jolla, Calif.

[73] Assignee: Reed Irrigation Systems, El Cajon, Calif.

[22] Filed: Apr. 8, 1976

[21] Appl. No.: 675,072

[52] U.S. Cl. .............................. 210/106; 210/138; 210/332
[51] Int. Cl.² ........................................ B01D 35/22
[58] Field of Search .......... 210/102, 106, 134, 138, 210/139, 142, 332, 108; 55/213, 283

[56] References Cited

UNITED STATES PATENTS

| 2,183,075 | 12/1934 | Hughes | 210/106 |
| 2,828,017 | 3/1958 | Ronningen et al. | 210/102 |
| 3,388,799 | 6/1968 | Rymer | 210/102 |
| 3,422,956 | 1/1969 | Hadden | 210/106 |

Primary Examiner—John Adee
Attorney, Agent, or Firm—Owen, Wickersham & Erickson

[57] ABSTRACT

A filtration system which may include multiple filters capable of being individually washed of clogging filtrate material by a "blow-down" or flushing operation, is regulated by a blow-down controller device. Each filter has a blow-down discharge valve which is normally maintained closed by a required level of fluid pressure in a pilot line connected to the valve. This pressure is supplied by the controller device, which draws pressure from an inlet line feeding all the filters. When the controller relieves pressure in one of the pilot lines, the filter associated with that pilot line is subjected to blow-down for a predetermined time period. To determine when blow-down of one or more filters is required, the controller senses pressure differential between the common inlet line and a common filter outlet line. When the pressure differential reaches a certain level, it indicates that the filters are sufficiently clogged by filtrate to require blow-down. The controller initiates blow-down in one or more of the filters sequentially, returning to the sensing mode after each blow-down cycle, until the pressure differential drops below the level indicative of the need for cleaning.

16 Claims, 11 Drawing Figures

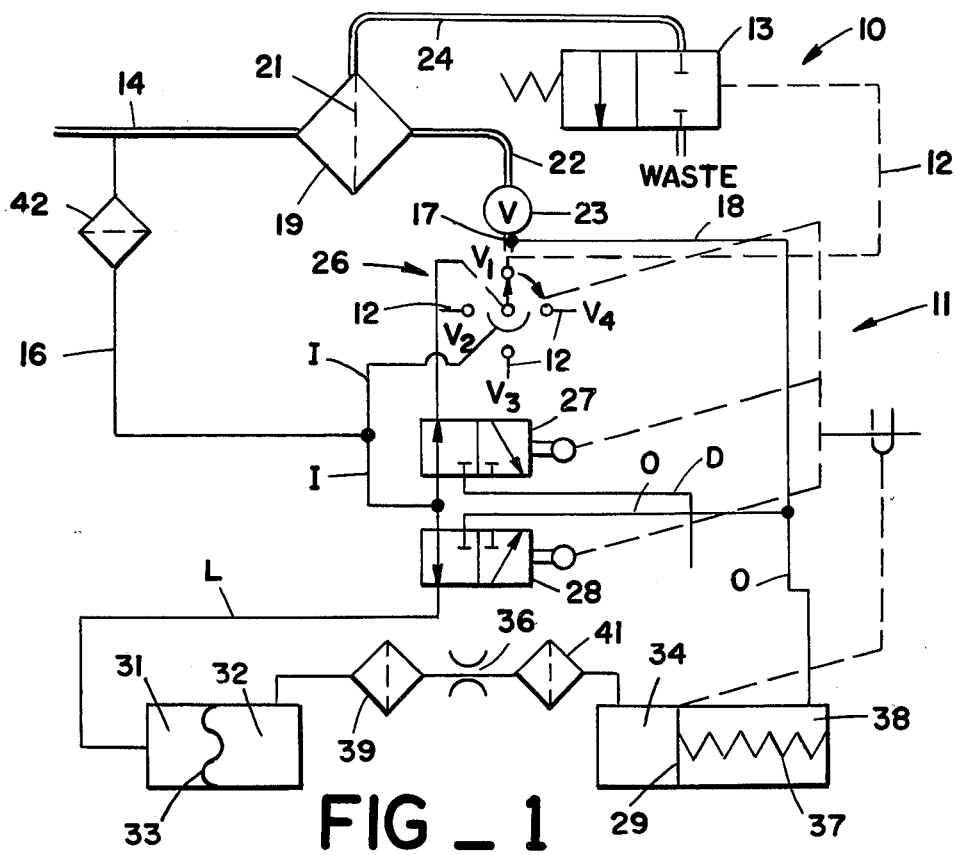
FIG_1
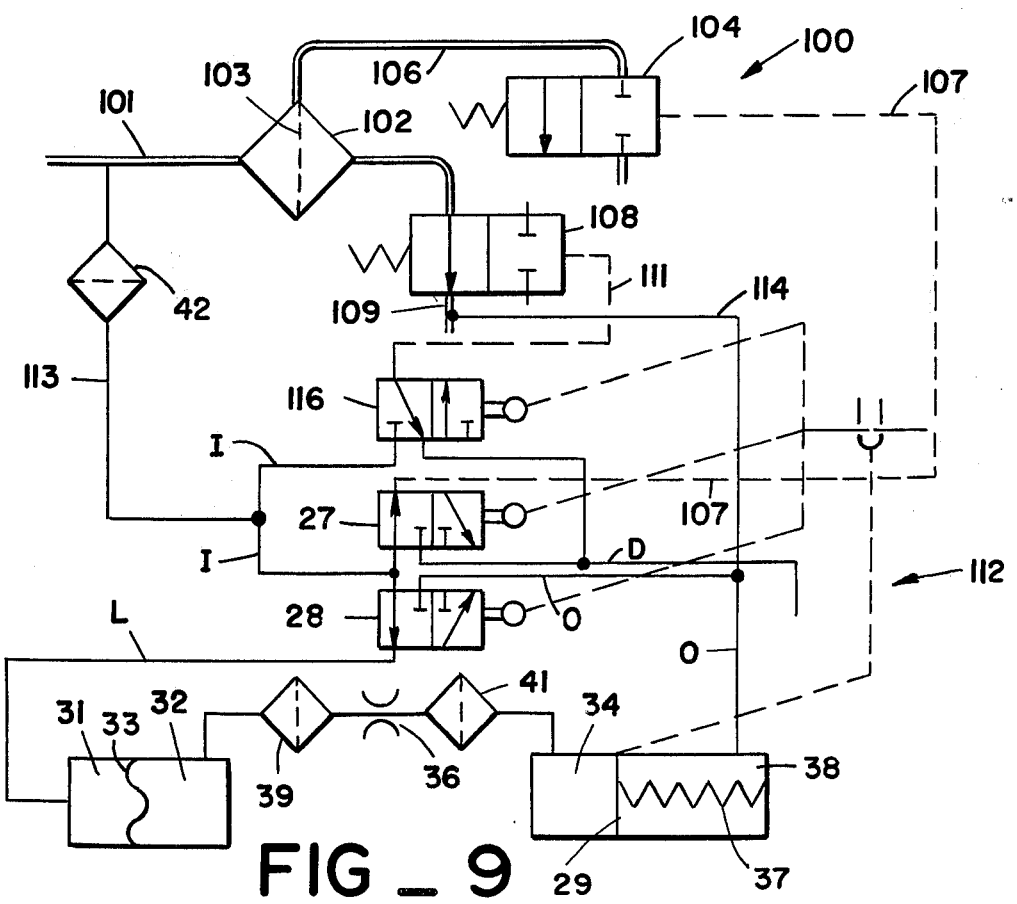
FIG_9

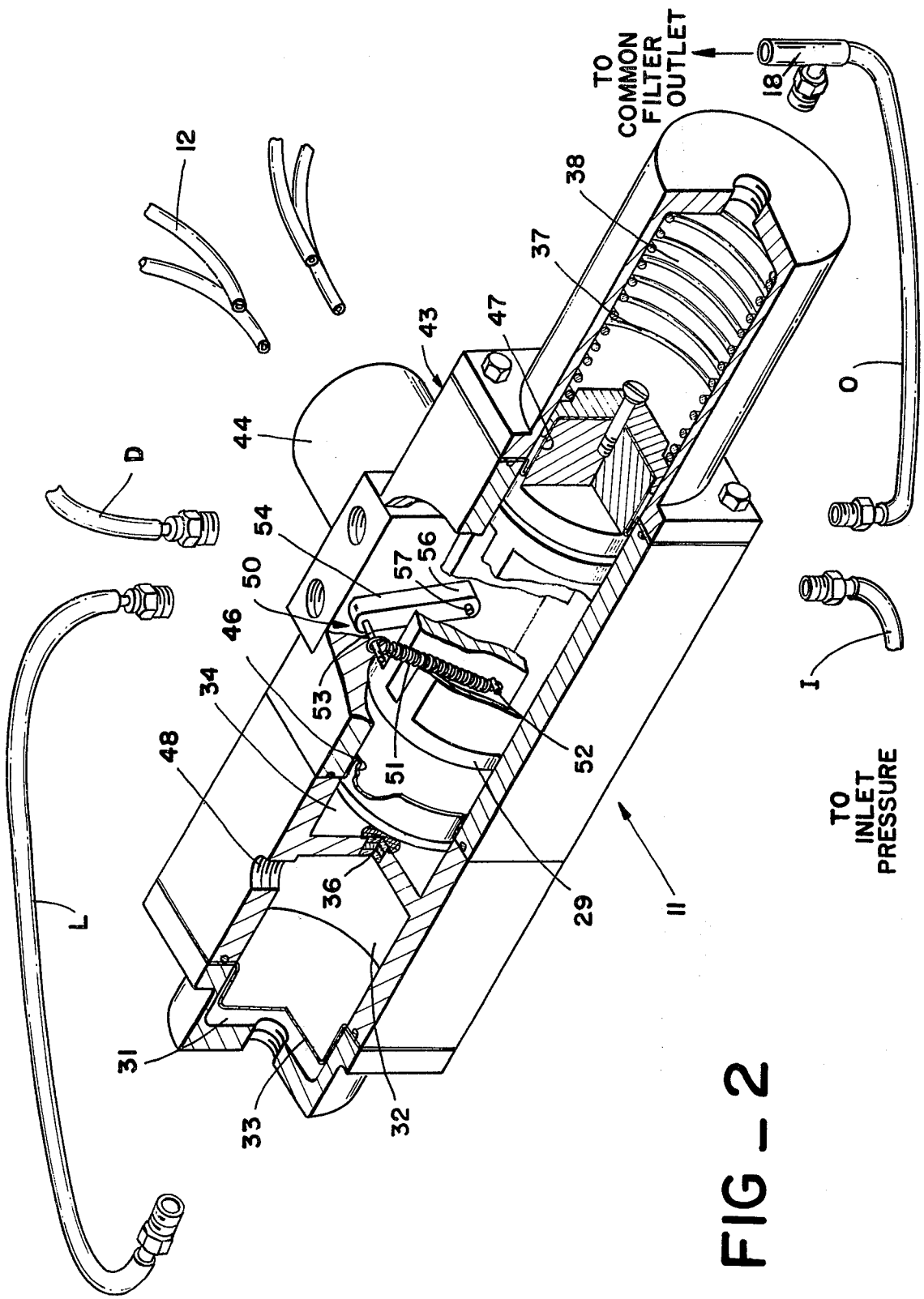
FIG_2

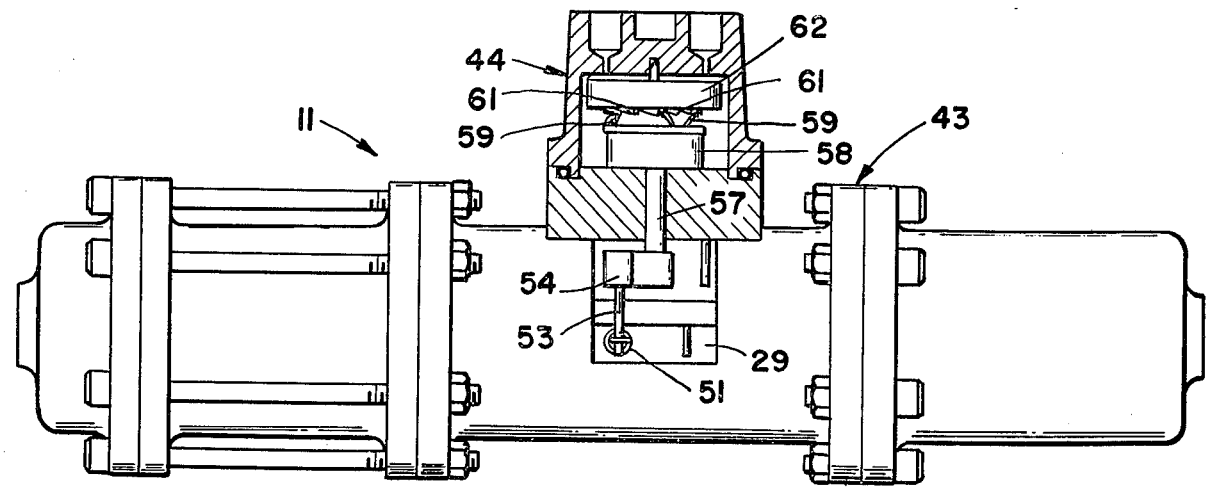
FIG _ 3
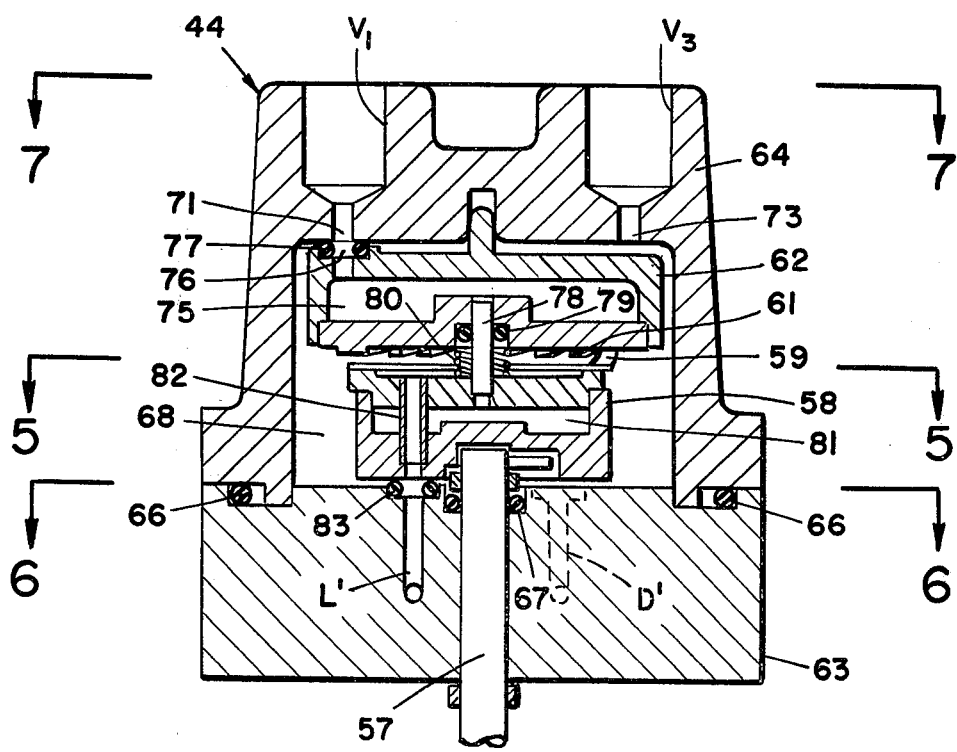
FIG _ 4

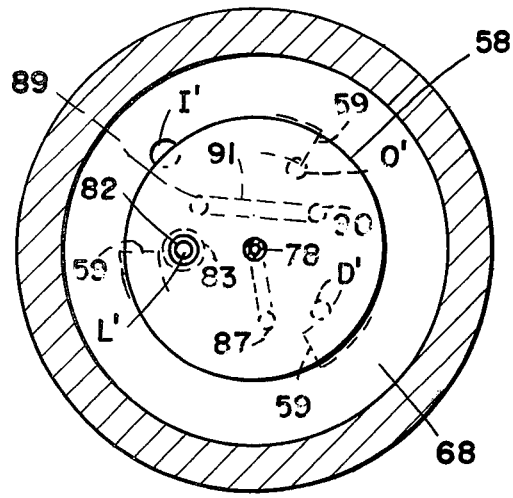
FIG_5
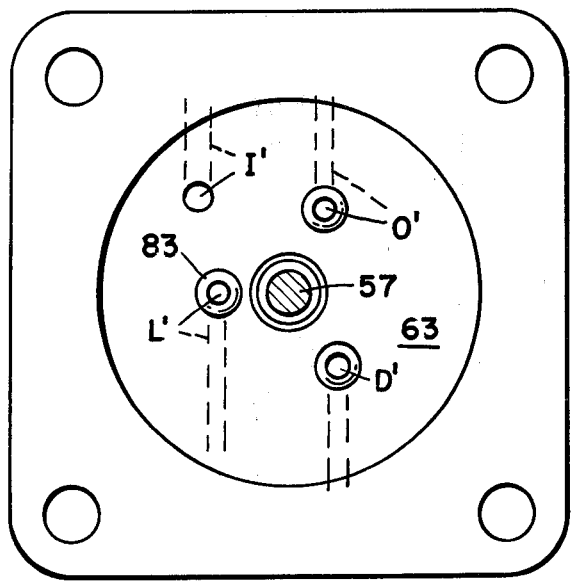
FIG_6
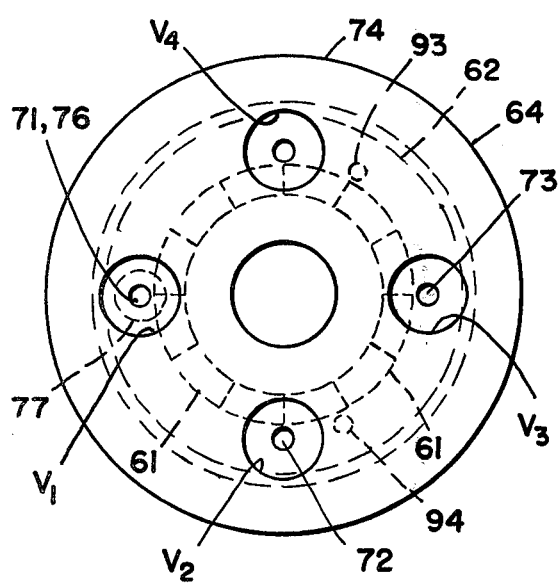
FIG_7
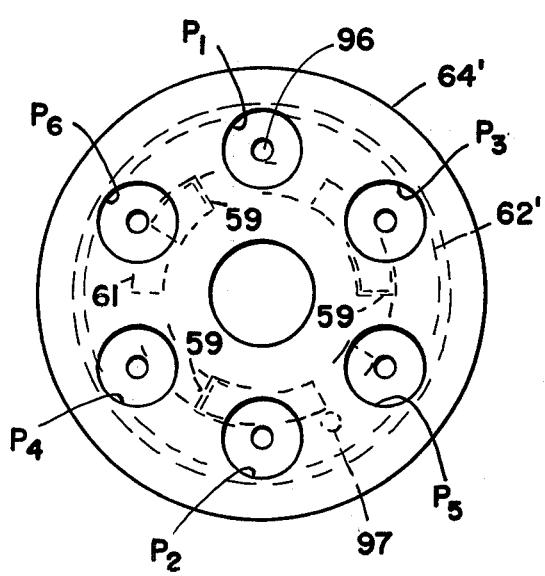
FIG_8

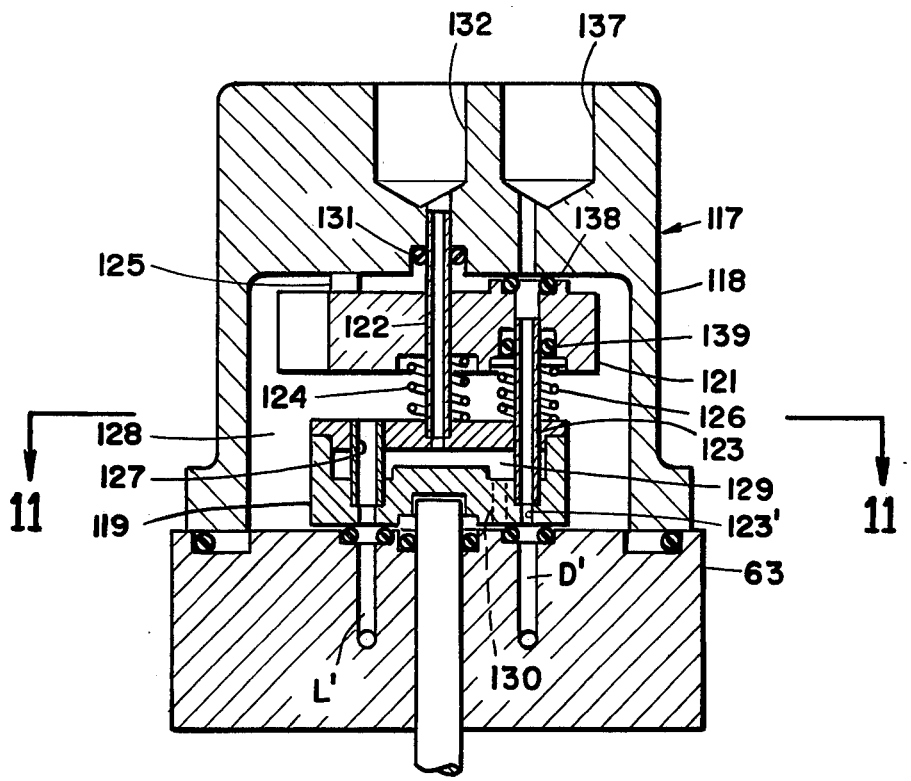
FIG _ 10
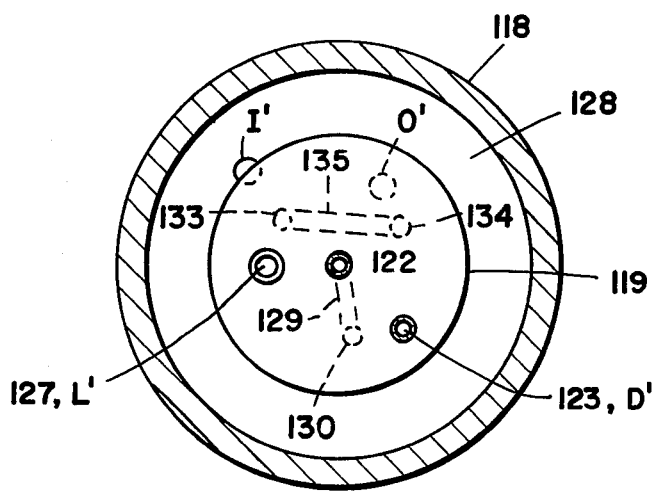
FIG _ 11

4,005,013

DIFFERENTIAL CONTROLLER VALVE AND SEQUENCER

BACKGROUND OF THE INVENTION

The invention relates to liquid filtration systems, and more particularly to the provision and control of automatic periodic cleaning of filter elements.

Filter systems, particularly those associated with silt-laden water, often clog with filtrate rather frequently, requiring periodic cleaning. In the past, such cleaning has been provided through backwash or through a flushing process sometimes known as blow-down, involving a rapid rush of unfiltered liquid over but not through the filter mesh element to a blow-down discharge opening, carrying most of the clogging material along and cleaning the filter. This operation, which bypasses the normal filter outlet to dump the filtrate laden liquid as waste, continues for a short period of time, then the blow-down discharge valve is closed and normal filtration resumes. This blow-down type of filter assembly, and systems incorporating a group of such filter assemblies, are the type of filtration systems to which the present invention relates.

Operation of such blow-down cleaning filter systems has previously been cumbersome or inefficient, or the systems have been expensive to set up and maintain. The operation and sequencing of the cleaning cycles has often been performed by hand or electronic systems which were expensive and rather sophisticated, in addition to requiring a source of electricity in sometimes remote locations.

SUMMARY OF THE INVENTION

The present invention provides a completely hydraulic and mechanical control system for use with blow-down discharge type filter systems, requiring no hand operations or electronic controls. Each filter assembly associated with the system of the invention includes a blow-down discharge valve which is operated by pressure in a pilot line connected to the valve. In such a valve, a predetermined level of pilot fluid pressure is required to close the valve and maintain it closed. Venting of the pilot line, so that the pressure falls below the predetermined level, opens the valve. In the system of the invention, the pilot line of the filter assembly valve, or the pilot lines from each valve of a plurality of filters having a common inlet and common outlet line, are connected to a blow-down controller which, by a connection to the inlet line of the filter or filters, normally supplies the required level of pressure in each of the pilot lines to keep each of the blow-down valves closed.

The blow-down controller device is also connected to the filter outlet, or the common filter outlet of a multiple filter assembly, by a small line which monitors pressure at the outlet. By comparing the inlet pressure with the outlet pressure, the controller senses when the filter or filters require cleaning (blow-down) by determining when the pressure differential between the inlet and the outlet has reached a predetermined level. When this predetermined pressure differential is sensed, the controller relieves pressure in one of the blow-down valve pilot lines for a period of time to effect blow-down of that filter.

On a single-filter installation the controller also closes the outlet valve via a pilot pressure assembly similar to that of the blow-down valve, by supplying inlet fluid pressure through an outlet valve pilot line during blow-down. This is usually necessary in a simple filter installation because inlet line pressure is normally not high enough for effective blow-down without outlet shutoff, whereas in a multiple filter system the pressure is considerably higher and the outlet of the filter being cleaned may be left open.

Such multiple systems, however, require an ordered sequencing of blow-down of the various filters, since the common outlet pressure, rather than the outlet pressure at each filter, is monitored, and only one filter at a time should be blown down to avoid excessive pressure drop at the operating filters. Therefore, the controller includes means for subjecting one preselected filter to blow-down upon the sensing of the required pressure differential. When the blow-down cycle of the one filter is completed, the controller automatically selects the next filter in the sequence for blow-down when the controller again senses the required pressure differential. If the filters are significantly clogged and the cleaning of one filter is not sufficient, the controller may continue to sense the required pressure differential after blow-down of the first filter, so that blow-down is then performed on the next filter in the sequence. The controller in this way continues through the sequence of filters until, following completion of a blow-down cycle on a filter, the predetermined pressure differential is no longer sensed. The controller is then set on the next filter in the sequence for blow-down when the required pressure differential again occurs due to clogging of the filters.

Following blow-down of a filter, the controller device re-supplies inlet line pressure to the pilot line of the blow-down valve. In the case of a single filter system, the controller also vents the outlet valve pilot upon completion of the blow-down cycle, so that the outlet valve is again opened for normal filtration.

To perform its regulatory functions and the required switching of control pressures, the controller device includes a reciprocable piston with fluid chambers at either end, one end receiving inlet fluid pressure and the other receiving the fluid pressure of the common outlet. The piston position is shifted against the bias of a spring when the required level of pressure differential between the inlet and the outlet is reached. This actuates a rotary spool assembly which vents the selected pilot line, cuts off the inlet pressure source from the high pressure side of the piston, and connects the two fluid chambers together, with a restrictive orifice between them, so that pressure in the two chambers is equalized and the piston is returned over a time period to its original position. The return of the piston disconnects the two chambers, re-connects the high-pressure chamber to the inlet source so that sensing of the pressure differential again occurs, resupplies the vented blow-down pilot line with inlet pressure, and shifts a rotary sequencer to the pilot line of the next filter in sequence so that when blow-down is again required, this next sequential filter will be cleaned.

The controller device and system of the invention thus provide an efficient mechanical and hydraulic means for cleaning one or a plurality of filters when the need for such cleaning is detected by an automatic sensing means. The need for manual steps or sophisticated electronic equipment is eliminated. It is therefore among the objects of the invention to provide a blow-down controller for a filtration system, and a system including such a controller, which provide for effective filter cleaning and avoid inlet pressure drop in the case of a multiple filter system, without resort to electric or electronic valving controls.

Other objects, advantages and features of the invention will become apparent from the following detailed description, presented in conjunction with the accompanying drawings.

DESCRIPTION OF THE DRAWINGS:

FIG. 1 schematically indicates a multiple filter system according to the invention, including a sequential blow-down controller;

FIG. 2 is a perspective view of the controller alone;

FIG. 3 is a partially sectioned and partially broken-away elevational view of the controller, showing the interior of a sequencer assembly;

FIG. 4 is a sectional detail view of the sequencer assembly;

FIG. 5 is a schematic plan view taken along the line 5—5 of FIG. 4, showing a primary valving spool and its relationship with the sequencer housing;

FIG. 6 is a schematic plan view taken along the line 6—6 of FIG. 4, showing the housing surface below the primary valving spool;

FIG. 7 is a schematic plan view taken along the line 7—7 of FIG. 4 indicating the upper portion of the housing for a four-filter sequencer assembly, with a secondary sequencer spool shown below;

FIG. 8 is a view similar to FIG. 7, but with the sequencer being adapted to a six-filter system;

FIG. 9 represents another embodiment of the invention, schematically indicating a single-filter system including a blow-down controller;

FIG. 10 is an elevational sectional view of the sequencer assembly of the controller of FIG. 9, with rotational alignment partially altered for clarity; and FIG. 11 is a schematic plan view taken along the line 11—11 of FIG. 10.

DESCRIPTION OF THE PREFERRED EMBODIMENTS

Multiple Filter System

In the drawings, FIG. 1 schematically represents a multiple filter system according to the invention, of which one filter generally indicated by the reference number 10 is shown connected to a blow-down controller assembly generally represented by the reference number 11. In the system to be described, each of the filter assemblies such as the filter assembly 10 is connected to the controller 11 by a blow-down pilot pressure line 12 originating at a pilot operated blow-down valve 13 of the filter assembly. The controller 11 is also connected to a common inlet line 14 from a pressurized fluid source (not shown) via a control line 16 which feeds inlet pressure to the controller, and to a common outlet line 17 via a control line 18 which feeds system outlet pressure to the controller. Each of the filter assemblies including the assembly 10 is fed from the common inlet line 14 downstream of the point of connection with the control line 16. Similarly, at the downstream end of the filtration system, each filter assembly including the assembly 10 feeds into the common outlet line 17 upstream of the point of connection with the pilot line 18.

As indicated schematically in FIG. 1, each filter assembly 10 includes a main filter 19 having a filter element the surface of which is indicated at 21, a flow channel indicated at 22 leading through an outlet valve 23 to the common line 17, and a conduit 24 leading from the upstream side of the filter element surface 21 to the blow-down discharge valve 13. During normal filter operation inlet liquid flows through the line 14 and through the main filter 19 to the common outlet line 17, leaving much of the filtrate material on the face of the filter element 21. When this filter element becomes excessively clogged, it is desirable to clean as much of the filtrate material as possible off the filter element. This is accomplished by opening the blow-down discharge valve 13 for a short period, providing a path of much lower resistance for the inlet liquid and thus causing a rush of flushing liquid over the face 21 of the filter element and out of the filter assembly through the blow-down discharge valve 13. During this operation the outlet valve 23 may be left open and cleaning will nonetheless be effective since the blow-down offers such a lowered flow resistance. Because blow-down of a filter assembly always causes something of a pressure drop in the common inlet line 14 leading also to operating filters, it is preferable that only one filter assembly at a time in the system be subjected to blow-down.

The blow-down controller assembly 11 automatically provides for blow-down of one or more of the plurality of filter assemblies in a specified sequence, when it is determined that the system as a whole has been sufficiently clogged to require blow-down cleaning of at least one filter. The controller senses the need for cleaning by comparing the pressure in the common outlet 17 (fed to the controller via the control line 18) with the pressure in the common inlet line 14 (fed to the controller via the control line 16). Outlet pressure is of course always lower than inlet pressure, but when the differential between the two pressures reaches a predetermined level, it indicates that the filter elements are excessively clogged and that one or more should be cleaned until the pressure differential is again brought below the predetermined level. Control of blow-down at each filter assembly 10 is accomplished through a blow-down pilot line 12 in conjunction with the blow-down discharge valves 13. The opened or closed condition of the pilot operated valve 13 is responsive to fluid pressure in the pilot line 12. The valve is biased toward the open position as schematically indicated, so that when pilot pressure drops below a certain pressure the valve opens; it closes and remains in the closed position schematically indicated in FIG. 1 when pilot pressure exceeds and remains above the specified pressure level. Thus, the blow-down valve 13 is normally held closed by the maintenance of sufficient fluid pressure in the pilot line 12, but when blow-down is necessary, pilot pressure is relieved to below the required level and the blow-down valve 13 is opened. The controller 11 accomplished these functions and also progressively sequences the filter assemblies for blow-down when cleaning is required. The sequencer, schematically indicated by the reference number 26, is always positioned to vent the pressure in one of the blow-down pilot lines 12 when required. FIG. 1 illustrates a system wherein the controller is adapted to control four filter assemblies, the pilot connections of which to the controller 11 are denominated $V_1$, $V_2$, $V_3$ and $V_4$, with the $V_1$ connection shown selected for the next blow-down cycle. When the filter 10 associated with the connection $V_1$ has been cleaned, and the pilot line 12 has been repressurized, the sequencer 26 advances to the pilot connection $V_2$ and again begins sensing for the required pressure differential indicating the need for cleaning. If the blow-down of a single filter was not sufficient to adequately clean the system, the indicative pressure differential is again sensed and the pilot line associated with the pilot connection $V_2$ is vented for cleaning of the filter system associated with that pilot line. The cycle repeats until enough of the four filter assemblies have been cleaned to enable the pressure differential to drop into the normal range. During a blow-down cycle, all pilot lines other than the one being vented are pressurized by the controller to keep the respective blow-down lines closed; between blow-down cycles, all pilot lines are pressurized by the controller.

Schematically indicated valving means 27 and 28 cooperate with the sequencer 26 to control the venting and pressurization of pilot lines and to control the duration and re-setting of the blow-down cycle. As indicated, inlet fluid-pressure from the control line 16 is provided to three of the pilot connections via one conduit arrangement, and to the fourth through the valve 27, which is normally in the position shown. An inlet pressure supply line from the inlet control line 16 is denoted I. Pressure from the inlet source is sufficient to hold each of the blow-down valves in the system closed.

All of the fluid valving devices 26, 27 and 28 are controlled by the movement of a double-ended piston, both ends of which are indicated by the line 29 in the schematic representation at the bottom of FIG. 1. Inlet pressure is normally supplied to the high pressure side of the piston 29 through the valving device 28, a line L, a first fluid chamber 31, a second fluid chamber 32 separated from the first by a flexible isolation diaphragm 33, and a third fluid chamber 34 adjacent to the piston and connected to the second chamber 32 through a restrictive orifice 36. Inlet pressure is thus communicated to the high pressure face of the piston 29. The piston is biased to the left in FIG. 1 by a compression spring 37 positioned in a low pressure fluid chamber 38 on the low pressure side of the piston 29. Fluid pressure from the common outlet line 17 is supplied to the chamber 38 via the outlet control line 18 and the line 0. Inlet pressure is always higher than outlet pressure, but the piston 29 is normally restrained from movement to the right in FIG. 1 by the spring 37. However, when pressure drops sufficiently in the outlet chamber 38 due to filter clogging, providing a sufficient level of pressure differential between the chambers 34 and 38, the piston 29 moves to the right against the bias of the spring 37 and shifts the valving indicated at 27 and 28 so that (a) the selected pilot line at the sequencer 26 is connected to a drain or exhaust line D, cutting off inlet pressure from the pilot line, and (b) the line L is connected to the line 0 to equalize pressure between the chambers 31 and 32 and the chamber 38, so that fluid can begin to flow from the chamber 34 through the orifice 36 to the chamber 32, and from the chamber 31 through the lines L and 0 to the chamber 38. The return of the piston 29 occurs over a fixed time period irrespective of line pressure in the inlet 14, since inlet pressure is not connected into the piston assembly during this part of the cycle. Outlet pressure is connected by the line 18, but it acts the same in both directions and thus has no effect.

When the piston 29 has substantially completed its return, it shifts the valving devices 27 and 28 back to their normal positions shown in FIG. 1, and advances the sequencer 26 into a position so that the next sequential pilot line is selected for venting on the next blow-down cycle. Thus, re-pressurization of the pilot line 12 for the blow-down valve 13 occurs and sensing of the inlet-outlet pressure differential again commences by separation of the lines L and 0 and reconnection of the line L to inlet pressure.

The isolation diaphragm 33 separates the fluid chambers 31 and 32 so that the restrictive orifice is not subjected to inlet liquid which has not been thoroughly filtered. In fact, the isolated fluid in the chambers 32 and 34 may comprise a separate liquid, such as water mixed with anti-freeze for the required viscosity and to prevent freezing on the downstream side of the orifice 36. Filters 39 and 41 may also be provided on either side of the orifice for increased protection, and a control line filter 42 may be provided in the control line 16 to separate larger filtrate particles from the inlet liquid. Since the volume of flow through the control line filter 42 is very low, it seldom needs cleaning.

The mechanical apparatus of the controller 11 which accomplishes the above functions is illustrated in FIGS. 2 through 8. FIG. 2 shows the controller device 11 in perspective, partially broken away to indicate the piston 29, the fluid chambers 31, 32, 34 and 38, the isolation diaphragm 33 and the restrictive orifice 36. A housing 43 forms the various chambers, receives the piston 29 for sliding movement therein, and holds the compression spring 37 in position at the outlet end of the piston. The housing also supports a sequencer assembly 44 and provides connections for the line L, the drain line D, the line I and the line 0 (I and 0 connection sockets not visible in FIG. 2). Rolling diaphragm seals 46 and 47 may be provided to seal the ends of the piston against leakage of chamber fluids. A filling port 48 is provided for addition of the isolated fluid into the chambers 32 and 34.

A spring-operated toggle or over-center device 50 translates the gradual movement of the piston 29 into an instantaneous snap action for operating the rotary components of the sequencer assembly 44. The toggle assembly 50 includes a tension spring 51 connected at one end to a pin 52 on the piston and at the other end to a pin 53 on a lever arm 54 rotationally supported at its opposite end 56. Travel of the piston 29 to the right in FIG. 2 to a predetermined extent shifts the angle of the tension spring 51 to the extent that it suddenly rotates the lever arm 54 about the end 56, to the maximum right position of the arm 54. The angle through which the lever arm travels is preferably about 34°. This quick shifting of the lever arm 54 rotates a shaft 57, the end of which is seen in FIG. 2 affixed to the end 56 of the lever arm. As indicated in FIGS. 2 and 3, the outer end of the lever arm 54 is exposed so that it can be manually shifted, if desired, to cause blow-down without shifting of the piston 29.

FIG. 3 shows the blow-down controller device 11 in partially sectioned elevation with the sequencer assembly 44 oriented upwardly. The outer end of the lever arm 54 appears, with the pin 53 connected to the end of the spring 51. A portion of the piston 29 also appears. The sequencer assembly 44 is seen in section to illustrate the rotary shaft 57 connected to a primary valving spool 58. Each time the lever arm 54 rotates through its arc of about 34°, the shaft 57 and primary valve spool 58 rotate similarly. Pawls 59 extending from the upper face of the primary spool 58 are in engagement with ratchet teeth 61 of a secondary sequencer spool 62 positioned just above the primary spool. On the stroke of the piston 29 at the beginning of the blow-down cycle (to the right in FIGS. 1, 2 and 3), the pawls 59 slip on the ratchet teeth 61 and the secondary spool 62 remains stationary. On the return stroke of the piston 59 at the end of the blow down cycle, the return of the toggle lever arm 54 and the rotation of the primary spool 58 carries the secondary sequencer spool 62 through an arc of 30°, via the pawl and ratchet connection. The additional few degrees of rotation traveled by the primary spool 58 ensure effective pawl engagement with the ratchet teeth 61. As will be seen below, the rotation of the secondary spool 62 through an increment of 30° provides the sequential shifting of blow-down pilot lines for venting, as illustrated by the schematic valve sequencer 26 of FIG. 1.

FIG. 4 is an enlarged view of the sequencer assembly 44. As indicated, the primary spool 58 and the secondary spool 62 may each comprise two or more parts. Two housing components 63 and 64 connected to the main housing 43 of the controller are sealed together by an O-ring 66, and the shaft 57 is sealed against the housing component 63 by an O-ring 67, to form a sealed fluid chamber 68 which receives inlet pressure as will be seen below. The chamber 68 is always open to all but one of the pilot connections $V_1$, $V_2$, $V_3$, and $V_4$ which are positioned in the end cover housing component 64 as shown in FIG. 4. The pilot connections $V_1$ through $V_4$ may be threaded to receive pilot lines (not shown), or other connecting means may be provided. Each pilot connection includes an interior port, of which ports 71 and 73 of the pilot connections $V_1$ and $V_3$, respectively, are seen in FIG. 4. One port at a time is connected to the interior 75 of the secondary spool by one of three ports 76 in the upper surface of the spool 62, sealed against the surface of the housing component 64 by an O-ring 77. The interior 75 of the secondary spool 62 in turn connects, through a central hollow shaft or tube 78, extending from the primary spool 58 and sealed by an O-ring 79, with the interior 81 of the primary spool. A compression spring 80 urges the two spools apart for proper port engagement at top and bottom of the chamber 68. The primary spool interior 81 either is open to the fluid chamber 68 to provide inlet fluid pressure to the single selected pilot connection ($V_1$ in FIG. 4), or makes connection with the venting drain, depending upon whether the controller is in a blow-down cycle, as will be seen below. Thus, the primary spool serves as the valving device 27 schematically indicated in FIG. 1.

Since the fluid chamber 68 is always connected to inlet pressure, an open-ended conduit 82 passing through the primary spool 58 is also continuously connected to inlet pressure at its upper end. As shown in FIG. 4, this conduit 82 is normally connected via an O-ring seal 83 to a passageway L leading to the line L, which in turn leads to the high pressure or inlet end of the piston 29 as discussed above. Thus, inlet pressure is normally supplied to the piston-controlling fluid chamber 31 as seen in FIGS. 1 and 2.

FIG. 5 shows the primary spool 58 in plan view, indicating the effect of its counterclockwise rotation through the 34° arc during blow-down but showing the spool in its normal position. FIG. 6 shows the upper surface of the housing component 63 just below the primary spool 58. As indicated in FIG. 5, the central hollow shaft 78 extending upwardly from the primary spool is connected via the interior 81 of the primary spool, shown diagrammatically as a passageway in the primary spool, to a port 87 in the bottom of the primary spool. This port 87 is normally open to the fluid chamber 68, and thus to inlet fluid pressure in accordance with the above discussion. However, upon rotation of the primary spool through its 34° arc, the primary spool port 87 becomes engaged with an O-ring sealed port and passageway D' in the surface of the housing component 63 below (see also FIG. 6). This cuts off the interiors of the primary and secondary spools, and the one selected pilot connection, from inlet pressure and switches them to the venting drain D, to which the port and passageway D' are connected. In this way, the valving function of the schematically indicated valving device 27 of FIG. 1 is performed by the rotation of the primary spool 58.

The rotation of the primary valve spool 58 also performs the function of the schematically indicated valving device 28 of FIG. 1, through shifting of a pair of ports 89 and 90 in the bottom of the primary spool, connected together by an internal passageway 91. As can be envisioned from FIGS. 5 and 6, as the primary spool 58 rotates through its approximately 34° arc, the bottom port 89 moves into sealed engagement with the passageway port L', where the spool conduit 82 was formerly engaged, and the bottom port 90 moves into engagement with an O-ring sealed passageway port O' which connects with the line O leading to the low pressure piston chamber 38 and to the control line 18 from the common filter outlet. The port O' is normally sealed off against the smooth bottom surface of the primary spool 58, so that inlet pressure maintained within the space of the fluid chamber 58 (see FIG. 4) cannot flow into the outlet lines O and 18. Similarly, the O-ring sealed port D' is sealed against the bottom of the primary spool when the controller is not on blow-down cycle.

As shown in FIG. 6, an inlet passageway I' through which inlet pressure communicates with the interior of the chamber 68 does not include an O-ring seal, unlike the passageway ports L', O' and D'. Inlet pressure is always required for all but one of the pilot lines of the filter system so that the passageway I' (leading from the inlet line I) should always be open.

It is thus seen that the primary valving spool 58, in conjunction with the ports L', O' and D' below and with the fluid chamber 68 performs the functions of the two valving devices 27 and 28 of FIG. 1 through its toggle connection with the reciprocable piston 29.

FIG. 7 shows the sequencer assembly of FIG. 4 from above, indicating the top of the cover housing component 64 and the secondary sequencer spool 62 below in dashed lines. The pilot line connections $V_1$ and $V_3$ seen in FIG. 4, in addition to pilot connections $V_2$ and $V_4$, are indicated along with corresponding pilot ports 71, 72, 73 and 74. The secondary sequencer spool 62 below includes three O-ring sealed ports in its upper surface, each of which is in communication with the interior 75 of the secondary spool: the port 76, shown in engagement with the pilot port 71 in FIGS. 7 and 4, and ports 93 and 94 each evenly spaced at 120° from the port 76 and from one another. As can be envisioned from FIG. 7, an incremental rotation of 30° of the secondary spool, which occurs through engagement of the primary spool at the end of each blow-down cycle will always move the connected one of the ports 76, 93 and 94 out of engagement with a pilot port and another into engagement with another pilot port. The order of this sequence will be $V_1$, $V_2$, $V_3$, $V_4$, $V_1$, etc. The three pilot ports not engaged with the secondary spool are in direct communication with the fluid chamber 68 and inlet pressure, as indicated in FIG. 4.

As a pilot port comes into engagement with a secondary spool port, it also communicates with the interior 75 of the secondary spool and the interior 81 of the primary spool, as discussed below. Through primary spool porting, this normally feeds pilot line pressure to the subject pilot port, so that all pilot ports have inlet pressure, but during blow-down vents the subject pilot port by connecting it to the drain line D.

Any number of pilot lines and filters from 1 to 4 can be regulated by the four-pilot sequencer assembly 44. If fewer than four pilot lines are involved, the unneeded pilot connections are simply sealed off. The result is that when one of the secondary spool ports 76, 93 and 94 comes into engagement with a sealed port, no pilot line is drained and the primary valving spool performs the function of the schematically indicated valve 28 in FIG. 1 but not of the schematically indicated valve 27. Therefore, the piston 29 is returned over its timing cycle to its sensing mode, where it determines that blow-down is still required and it quickly moves to the blow-down position again. This occurs until one or more filters have actually been cleaned.

FIG. 8 shows a modified form of cover housing component 64' and secondary sequencer spool 62' for use with five and six-filter multiple systems. Six pilot connections equally spaced at 60° around the top of the housing component 64' are numbered $P_1$ through $P_6$, in the order in which they would be selected for the first six blow-down cycles as the secondary spool advances counterclockwise through one revolution. The secondary spool 62' below (dashed lines) includes two O-ring sealed ports 96 and 97 in its upper surface, spaced 150° apart. Thus, as indicated in FIG. 8, only one of the ports 96 and 97 at a time is engaged with a pilot port, the other being half way between a pair of pilot ports. As the secondary sequencer advances in 30° increments, the indicated sequence results. Only the secondary sequencer spool and the sequencer assembly cover housing component need be interchanged to modify a controller device from four-filter capacity to six-filter capacity. As discussed above in connection with the four-filter embodiment, the six-filter controller may be used for fewer than six filters by sealing off unused pilot ports.

Single Filter System

FIG. 9 shows a single filter system including an automatic blow-down controller. As in the example filter of FIG. 1, the single filter assembly 100 of the system of FIG. 9 includes an inlet line 101, a main filter 102 with a filter element surface 103, and a blow-down discharge valve 104 connected by a flow channel 106 to the main filter upstream of the filter element surface 103. The blow-down valve 104 is pilot operated in the same way as the valve 13 described above, with a pilot line 107 normally supplying inlet fluid pressure to maintain the blow-down valve closed. However, the filter assembly 100 also includes a pilot operated outlet valve 108 for shutting off flow through an outlet line 109 during blow-down. As indicated above, this shut-off is usually necessary in a single filter system, as opposed to a multiple filter system, because line pressure is generally lower and the pressure drop caused by an open outlet should be eliminated for effective cleaning. The outlet valve 108 is operated by pilot pressure through an outlet pilot line 111 in the same manner as the blow-down valve 104, except that the line 111 is normally vented so that it is normally open. During the blow-down cycle, pressure is provided in the pilot line 111 to shift the outlet valve 108 to the closed position for the duration of the cycle.

In the single filter system, a blow-down controller generally indicated by the reference number 112 is connected to the filter 100 in much the same way as described above in connection with the multiple filter system. An inlet pressure control line 113 from the inlet line 101 normally supplies pressure through a valving assembly 28 to the high pressure side of a piston 29 by a line L, fluid chambers 31, 32 and 34, an orifice 36, etc. Outlet pressure is normally supplied to the downstream side of the piston 29 by an outlet control line 114 and a line O. During the blow-down cycle, the valving device 28 shifts to connect the L and O lines and provide for the return of the piston. Also during the blow-down cycle, a valving device 27 disconnects the pilot line 107 from inlet pressure and connects it to a drain line D to shift the blow-down valve 104. However, the controller 112 does not include a pilot sequencer similar to the device schematically indicated at 26 in FIG. 1, but rather includes a third valving device 116 which normally connects the outlet pilot line 111 with the drain line D, but shifts at initiation of the blow-down cycle to supply inlet pressure in the pilot line 111, thereby closing the pilot operated outlet valve 108 during the blow-down cycle. The valving device 116 is operated mechanically and hydraulically by travel of the piston 29, similarly to the valving devices 27 and 28.

The discussion below will concentrate on the differences between a single filter controller 112 and multiple filter controller 11. The piston portion of the controller is identical to that described above, but there are some modifications in the sequencer assembly. As will be seen, a multiple filter controller may be converted into a single filter controller by interchange of only a few components.

FIGS. 10 and 11 illustrate the structure and operation of a sequencer assembly 117 of the single filter controller 112, and the differences between the assembly 117 and the multiple filter sequencer assembly 44 illustrated in FIGS. 4 – 8. The elevational section view of FIG. 10 is shown with certain parts not in their true rotational alignment for clarity of illustration. FIG. 6 should also be referred to along with FIGS. 10 and 11, since it diagrammatically illustrates the housing surface below the primary valving spool and the separate ports included therein for both the multiple filter and single filter controller embodiments.

As shown in FIG. 10, the single filter controller sequencer assembly 117 includes a substituted cover housing component 118 and modified forms of primary and secondary spools 119 and 121, respectively. In this sequencer assembly the primary and secondary spools rotate together through the approximately 34 degree arc through which the above described primary spool rotated. The spools 119 and 121 are connected together by a central blow-down control tube 122 and an outlet control tube 123, both of which are preferably press-fit into the primary spool 119. Compression springs 124 and 126 are positioned around the tubes 122 and 123, respectively, to bias the secondary spool upwardly as shown against a surface of the component 118 and to bias the primary spool downwardly against the surface of the housing component 63, which is the same as that shown in FIG. 4 and diagrammatically indicated in FIG. 6. Two small tabs 125 may be provided on the upper surface of the upper spool 121 to contact the surface of the housing component 118 and balance the spool there against.

The primary spool 119 itself is very similar to the primary spool 58 described above, as seen in FIGS. 10 and 11. It includes a through conduit 127 which normally connects with the O-ring bounded port and passageway L' leading to the line L (see FIGS. 1, 2 and 9) and with the interior fluid chamber 128 of the sequencer assembly 117, which is always supplied with inlet fluid pressure by the passageway and port I' leading from the line I. During blow-down, the through conduit 127 is displaced from the port L' so that the port L' no longer receives inlet pressure. Also, as illustrated in FIG. 11 in dashed lines, the primary valving spool 129 includes bottom ports 133 and 134 and a connecting passageway 135 which do nothing except during blow-down when they connect the passageways L' and O' as indicated, thereby connecting the lines L and O as discussed above. The primary spool 119 thus serves as the valving device 28 illustrated in FIG. 9, similarly to the primary spool of the above described embodiment.

The primary spool 119 also includes a central fluid chamber 129 connected to a central tube 122 and to a passageway and bottom port 130 (indicated in dashed lines in FIG. 10 although actually in front of the section plane) which is normally open to the housing chamber 128 and inlet pressure but which connects with the drain port and passageway D' during blow-down. This fluid path of the primary spool leads through the central tube 122 and an O-ring sealed connection 131 to the single blow-down pilot line connection 132. Thus, this part of the primary valving spool serves as the valving device 27 schematically illustrated in FIG. 9, venting the pilot connection 132 and the connected pilot line 107 (FIG. 9) during blow-down and reconnecting it to inlet fluid pressure between blow-down cycles. In FIG. 11 the flow path provided by the interior primary spool chamber 129 is indicated as a passageway between the central tube 122 and the passageway 130, as above in reference to the multiple filter embodiment.

The primary spool 119 differs from the spool of the previously described embodiment in that it includes the tube 123 and a connected port 123' in the bottom of the spool. As indicated in FIGS. 10 and 11, this port 123' normally makes connection with the port and passageway D' leading to the drain line D. Thus, an outlet valve pilot connection 137 normally connected to the tube 123 via secondary spool O-ring connections 138 and 139, is normally vented to the drain line, and the outlet valve 108 of FIG. 9 is normally open.

However, during blow-down when the primary and secondary spools are rotated through their approximately 34° arc, as envisioned with reference to FIG. 11 and also FIG. 10, the O-ring connection 138 at the top of the upper spool is broken and the port 123' at the bottom of the primary spool is disconnected from the drain passageway D', with the passageway D' then sealed off against the bottom of the primary spool. Therefore the outlet pilot connection 137 becomes open to inlet fluid pressure existing in the housing chamber 128 and the outlet valve 108 is closed as discussed above. In this way the primary and secondary spools 119 and 121 of the sequencer assembly 117 perform the function of the diagrammatically indicated valving device 116 of FIG. 9, discussed above.

The sequencer assembly 117 does not include sequencer spool or sequencing device in the sense of the secondary sequencer spool 62 used in the multiple filter embodiment of the controller. The two spools of the single filter controller could be provided as a single component, but are preferably structured as described and illustrated in the interest of interchangeability. Thus, it can be seen by a comparison of FIGS. 4 and 10 that only the cover housing component 64 and the primary and secondary spools 58 and 62 of FIG. 4 need be interchanged with the housing component 118, the primary and secondary spools 119 and 121 and the various tubes and springs to provide the single filter controller sequencer assembly of FIG. 10.

The above described preferred embodiments provide automatic blow-down controllers, and the systems in which they are incorporated, for filtration systems including a bank of parallel and commonly connected filters and for systems including single filters connected alone. The controllers and the control systems in which they are incorporated are relatively simple and inexpensive in manufacture but efficient and relatively maintenance free in operation, being entirely hydraulic and mechanical. Various other embodiments and alterations to these preferred embodiments will be apparent to those skilled in the art and may be made without departing from the spirit and scope of the following claims.

I claim:
1. In a liquid filtration system including a plurality of parallel filter assemblies connected to a common inlet source and a common outlet line, each filter assembly including a blow-down discharge valve which when opened is effective to clean the filter, such blow-down discharged valve being capable of being held closed by a predetermined minimum level of fluid pressure in a pilot line connected thereto, and opened by the relieving of such pressure, such pressure level being between atmospheric and that of the common inlet source, the improvement of a sequential blow-down controller, comprising:
   means connecting each pilot line from the plurality of filters to the controller in a specified sequence of positions;
   means receiving pressure from the common inlet source;
   means monitoring the outlet pressure at the common outlet line;
   means normally providing inlet source pressure in the pilot lines of the blow-down discharge valves;
   means for sensing a predetermined pressure differential between the common inlet and the common outlet, indicating that at least one of the filter assemblies requires blow-down;
   means for relieving the pressure in the blow-down pilot line of one of the filter assemblies in response to the sensing of said predetermined pressure differential and maintaining the pressure relief for a predetermined time period, thereby effecting blow-down of said one filter assembly for substantially said predetermined time period;
   means for resupplying inlet source pressure in said one filter pilot line at the end of said predetermined time period; and means for connecting the next pilot line in the sequence to said pressure-relieving means, following blow-down of said one filter assembly, for pressure relief of said next pilot line when said sensing means again determines that blow-down is required;

whereby blow-down of the filter assemblies continues in sequence until said predetermined pressure differential is eliminated by cleaning of at least one filter, and when the predetermined pressure differential again occurs, blow-down of at least one filter assembly again occurs, commencing with the filter assembly whose pilot line is next in sequence.

2. The blow-down controller of claim 1 wherein said outlet pressure monitoring means and said pressure differential sensing means include a reciprocable piston with housing means defining an expansible chamber at each end, means normally maintaining the pressure in one expansible chamber at substantially the inlet source pressure, means maintaining the pressure in the other expansible chamber at susbstantially the common outlet line pressure and spring means urging the piston toward said one expansible chamber, and further including means responsive to piston travel toward said other expansible chamber for actuating said pressure-relieving means, and to piston travel in the opposite direction for actuating said resupplying means at the end of said predetermined time period.

3. The blow-down controller of claim 2 which further includes means responsive to piston travel for actuating said connecting means.

4. The blow-down controller of claim 2 which further includes means responsive to piston travel toward said other expansible chamber for connecting the two expansible chambers and establishing a flow path between them, and flow-restricting means in the flow path between the chambers for delaying the return travel of the piston to provide said predetermined time period.

5. The blow-down controller of claim 4 wherein said one expansible chamber includes an isolation diaphragm dividing said one chamber into a piston side and an inlet source side, said flow-restricting means being positioned between the diaphragm and the piston, and wherein said pressure-maintaining means includes a conduit leading from the common inlet source into the inlet source side of said one chamber, whereby unfiltered fluid from said common inlet source is isolated from said flow-restricting means.

6. The blow-down controller of claim 2 wherein said means responsive to piston travel includes an abrupt switching means for delaying the activation of said pressure-relieving means until the piston has reached a blow-down position which is substantially its maximum position toward said other expansible chamber, and for delaying the actuation of said resupplying means until the piston has reached substantially its maximum position toward said one expansible chamber.

7. The blow-down controller of claim 6 wherein said abrupt switching means comprises an over-center toggle including a lever arm pivotally mounted at one end on said housing means and normally oriented obliquely to the path to travel of the piston, and a tension spring connected to the piston and to the other end of the lever arm.

8. The blow-down controller of claim 6 wherein said pressure relieving means and said pressure resupplying means include a primary valving spool rotatably mounted on the housing means and rotatable reciprocably through a fixed arc in response to operation of said abrupt switching means, said primary valving spool including conduit means effective in a rotated blow-down position to switch said one pilot line from inlet pressure to a pressure venting drain.

9. The blow-down controller of claim 8 wherein said primary valving spool includes means for establishing a flow path between said expansible chambers when the primary valving spool is in said rotated blow-down position, and further including flow-restricting means in the flow path between the chambers for delaying the return travel of the piston to provide said predetermined time period.

10. The blow-down controller of claim 8 wherein said means for connecting the next pilot line comprises a secondary rotary spool, means for rotating the secondary spool through an incremental arc in response to the return of the primary spool from its rotated blow-down position to its normal position, an array of pilot line ports in a portion of said housing means adjacent to the secondary spool, and porting means in the secondary spool for connecting said one pilot line to said conduit means of the primary spool until the secondary spool is rotated through said incremental arc, then connecting a next sequential pilot line to said conduit means.

11. A liquid filtration system, comprising:
a plurality of parallel filter assemblies connected to a common inlet source and a common outlet line, each filter assembly including a pilot operated blow-down valve effective to flush and clean the filter with unfiltered liquid when opened, each blow-down valve including means for closing the valve in response to a predetermined minimum level of pilot pressure and opened by the relieving of such pressure, said level being between atmospheric and that of the common inlet source;
a pilot line extending from each pilot operated blow-down valve of the plurality of filter assemblies;
an inlet control line extending from the common inlet source;
and outlet control line extending from the common outlet line; and
a blow-down controller connected to the inlet control line and the outlet control line and receiving each of the pilot lines in a specified sequence of positions, said blow-down controller comprising:
 a. means normally providing inlet source pressure in the pilot lines of the blow-down discharge valves;
 b. means for sensing a predetermined pressure differential between the common inlet and the common outlet, indicating that at least one of the filter assemblies requires blow-down;
 c. means for relieving the pressure in the blow-down pilot line of one of the filter assemblies in response to the sensing of said predetermined pressure differential and maintaining the pressure relief for a predetermined time period, thereby effecting blow-down of said one filter assembly for substantially said predetermined time period;
 d. means for resupplying inlet source pressure in said one filter pilot line at the end of said predetermined time period; and
 e. means for connecting the next pilot line in the sequence to said pressure-relieving means, following blow-down of said one filter assembly, for pressure relief of said next pilot line when said sensing means again determines that blow-down is required;

whereby blow-down of the filter assemblies continues in sequence until said predetermined differential is eliminated by cleaning of at least one filter, and when the predetermined pressure differential again occurs, blow-down of at least one filter assembly again occurs, commencing with the filter assembly whose pilot is next in sequence.

12. In a liquid filtration system including a filter assembly having an inlet source, an outlet line, a blow-down discharge valve which when opened is effective to clean the filter, such blow-down discharge valve being capable of being held closed by a predetermined minimum level of fluid pressure in a pilot line connected thereto, and opened by the relieving of such pressure, such pressure level being between atmospheric and that of the inlet source, the improvement of a blow-down controller, comprising:

means normally providing inlet source pressure in the blow-down pilot line;

means for sensing a predetermined pressure differential between the inlet source and the outlet line, indicating that blow-down is required;

means for relieving the pressure in the blow-down pilot line when said predetermined pressure differential is sensed, and for maintaining the pressure relief for a predetermined time period, thereby effecting a period of blow-down; and means for resupplying inlet source pressure in the blow-down pilot line at the end of said predetermined time period.

13. The blow-down controller of claim 12 which further includes means for closing said outlet line of the filter assembly during said predetermined time period.

14. The apparatus of claim 12 wherein the filter assembly includes a normally-open outlet valve capable of being held closed by a predetermined level of fluid pressure in an outlet valve pilot line connected thereto, and opened by relieving of such pressure, such pressure level being between atmospheric and that of the inlet source, and wherein the blow-down controller further includes means for supplying inlet source pressure to the outlet valve pilot line in response to the sensing of said predetermined pressure differential and for relieving the pressure at the end of said predetermined time period.

15. A liquid filtration system, comprising:
an inlet line;
an outlet line for filtered liquid;
at least one filter assembly operably connected to the inlet line and the outlet line, each filter assembly including a pilot pressure operated blow-down valve effective to flush and clean the filter with unfiltered liquid when opened in response to the relieving of pilot pressure, and including means for maintaining the valve closed with a predetermined minimum level of pilot pressure, said level being between atmospheric and that of the inlet line; and
a blow-down controller connected by fluid lines to the inlet line and the outlet line, comprising:
 a. means normally connecting each pilot operated blow-down valve with the inlet line to maintain the blow-down valve closed;
 b. means for relieving the pressure in one blow-down valve in response to the occurence of a predetermined pressure differential between the inlet line and the outlet line, indicating that filter cleaning is required, and for maintaining the pressure relief for a predetermined time period; and
 c. means for reconnecting said one pilot operated blow-down valve to the inlet line at the end of said predetermined time period.

16. A liquid filtration system, comprising:
an inlet line;
an outlet line for filtered liquid;
at least one filter assembly operably connected to the inlet line and the outlet line, each filter assembly effective to flush and clean the filter with unfiltered liquid when opened in response to the relieving of pilot pressure, and including means for maintaining the valve closed with a predetermined minimum level of pilot pressure, said level being between atmospheric and that of the inlet line; and
a blow-down controller connected by fluid lines the inlet line and the outlet line, comprising:
 a. housing;
 b. means within the housing normally connecting each pilot operated blow-down valve with the inlet line to maintain the blow-down valve closed;
 c. fluid pressure responsive reciprocable piston means within the housing for sensing a predetermined pressure differential between the inlet line and the outlet line, indicating that filter cleaning is required; and
 d. valving means associated with said piston means for disconnecting the inlet line from and relieving the pressure of one blow-down valve in response to the sensing of said predetermined pressure differential and maintaining the pressure relief for a predetermined time period.

* * * * *